Patented Feb. 21, 1928.

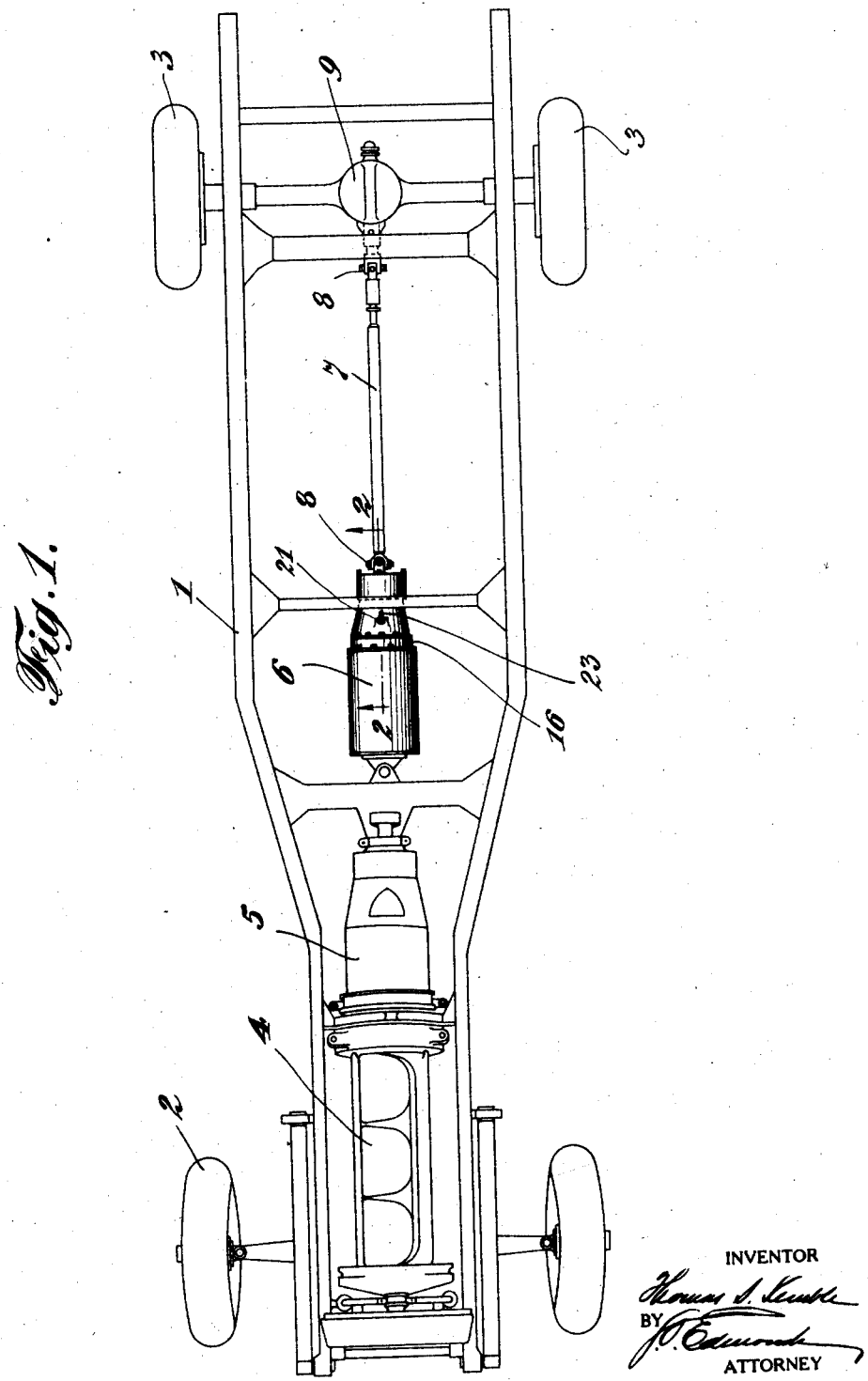

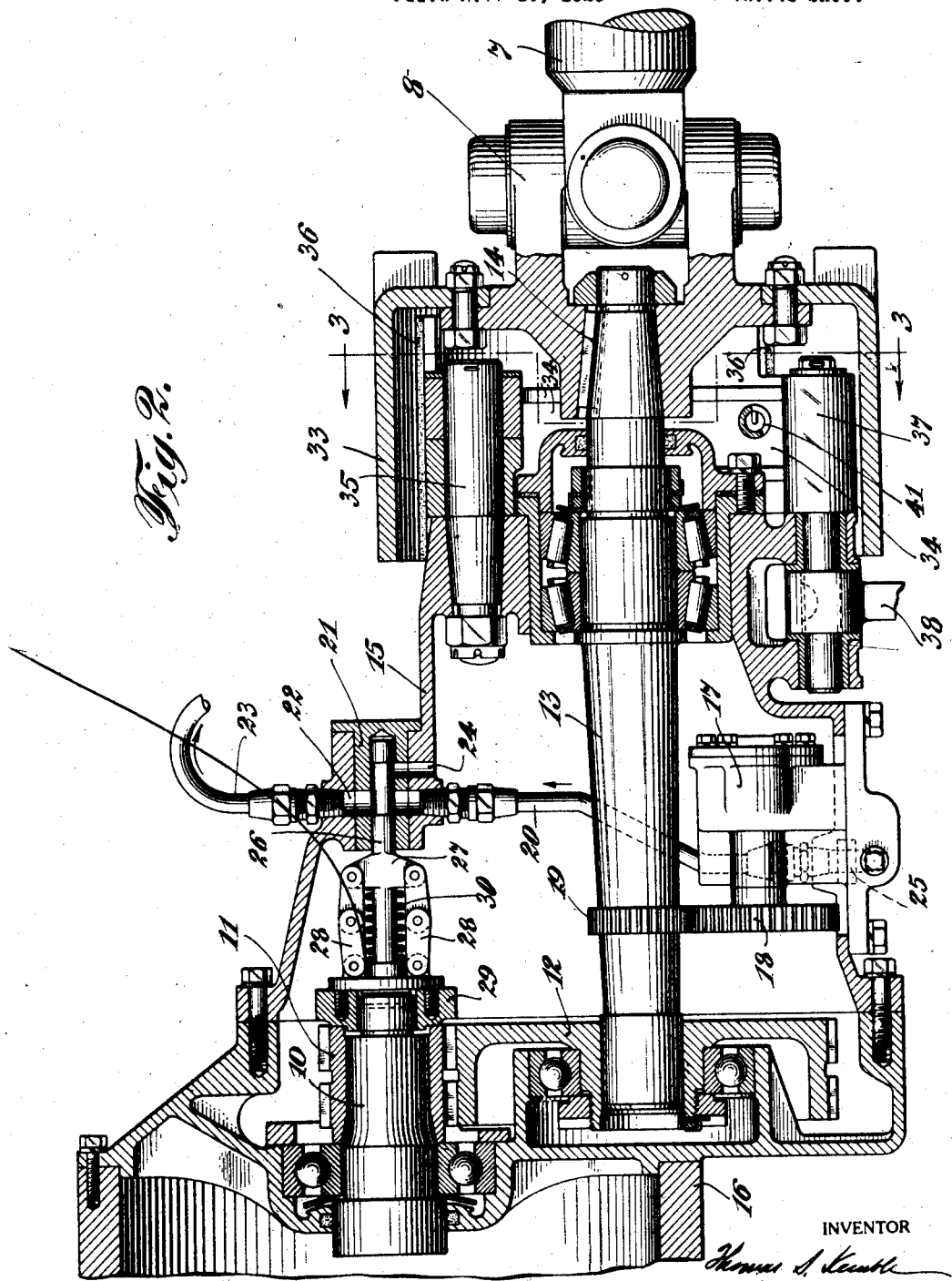

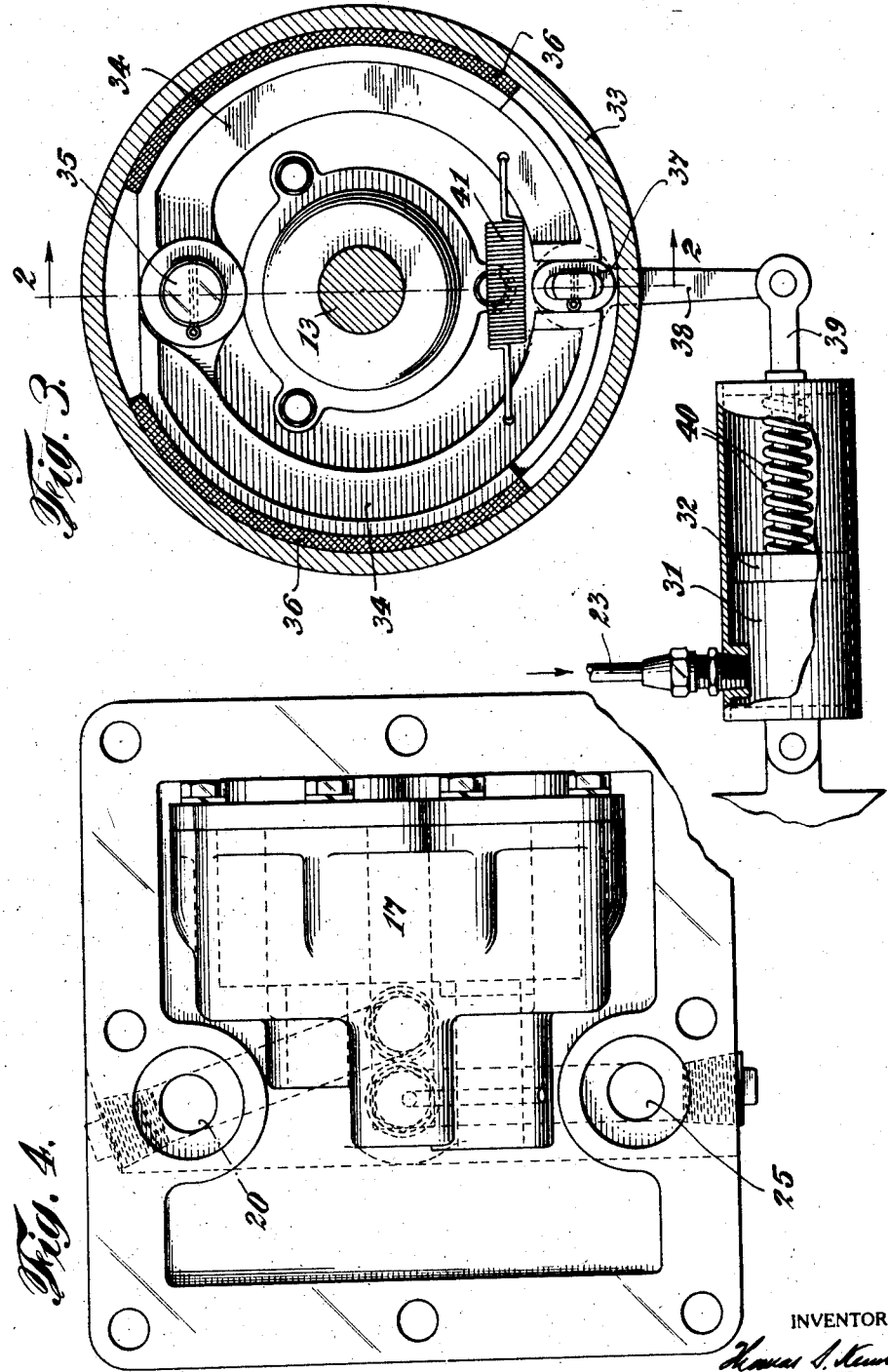

1,659,690

UNITED STATES PATENT OFFICE.

THOMAS S. KEMBLE, OF LAKEWOOD, OHIO.

GAS ELECTRIC DRIVE FOR VEHICLES.

Application filed November 16, 1925. Serial No. 69,316.

This invention relates to gas-electric drive for vehicles, and more particularly relates to means for automatically preventing the development of excessive or harmfully high motor speed.

In drives for automotive vehicles, especially buses and trucks which are designed for heavy loads, it is desirable to provide reduction gearing of large ratio (preferably greater than 15 to 1) between the motor shaft and the traction wheels in order to obtain the best acceleration and grade ability. On the other hand, when an electric motor is operated at too high rotational speed its rotor is apt to be burst or damaged by the centrifugal forces developed therein.

It is the principal object of my invention to provide automatically acting means which prevent the development in the motor and associated parts of centrifugal forces strong enough to cause damage thereto, and thereby to eliminate the necessity of relying on the driver of the vehicle to avoid and prevent such damage from this cause, while at the same time rendering available with complete safety the increased capacity resulting from the use of reduction gearing between the motor and the traction wheels, and permitting the driver to operate the vehicle in the usual manner.

Another object of my invention is to provide a simple, durable, and positively acting device and system of the character described.

Other objects of my invention will be in part obvious and in part pointed out hereinafter.

In accordance with my invention I provide a brake adapted to engage one of the rotating parts of the drive to resist rotation thereof and the parts associated therewith, including the motor. At normal speeds of motor rotation the brake does not act. However, I provide means whereby whenever, and as soon as, the motor reaches a certain speed (predetermined to be within the safety limit) the brake becomes set to prevent this speed from being exceeded.

In order that a clearer understanding of my invention may be had attention is hereby directed to the accompanying drawings forming a part of this application and illustrating one possible embodiment of my invention. In the drawings Fig. 1 is a diagrammatical plan view of an automobile chassis having a gas-electric drive with my invention incorporated therein; Fig. 2 is sectional view of a portion of the drive, and is taken on the line 2—2 of Figs. 1 and 3; Fig. 3 is a sectional view of a fragment of the construction, and is taken on the line 3—3 of Fig. 2; and Fig. 4 is an enlarged side view of the fluid pump casing, the construction being brought out by dotted lines. Similar reference characters refer to similar parts throughout the several views of the drawings.

Referring to the drawings, there is diagrammatically illustrated in Fig. 1 an automobile chassis comprising a chassis frame 1, front wheels 2, rear traction wheels 3, and a gas-electric drive for driving the wheels 3. The gas-electric drive comprises an internal combustion engine 4 which drives a dynamo or generator 5. Current from this generator is led to a motor within housing 6 and this motor is connected to the rear wheels 3 through propeller shaft 7 and universal joints 8 and differential in housing 9, whereby the vehicle is propelled. In order to obtain the best acceleration and grade ability, reduction gearing of large ratio is introduced between the rotor 10 of the motor and the propeller shaft 7. This gearing includes a small gear 11 keyed to the shaft 10 and in constant mesh with a larger gear 12 which is fixed to the end of a shaft 13 which at its other end is keyed, as at 14, to one hub of universal joint 8. The end of propeller shaft 7 is secured to the other hub of this universal joint.

A housing or casing 15 is secured to the end of the motor case or housing 16. Within this casing is an oil pump 17 having a driving pinion 18 driven by a gear 19 on shaft 13. This pump discharges fluid through conduit 20 into a piston valve 21 which has one outlet 22 leading into a conduit 23 and another outlet 24 which discharges into the interior of the casing 15, so that the fluid thus discharged will find its way back into the intake port 25 of the oil pump 17 for recirculation.

The piston 26 of valve 21 has a yoke 27 to which is secured one end of a centrifugal governor 28, the other end of this governor being secured to a ring or yoke 29 which is fixed to the end of motor shaft 10, so that the centrifugal governor will rotate with the motor shaft. A spring 30 keeps the governor 28 extended and the valve piston 26 beyond valve port 24 during normal speeds of motor shaft rotation. In this position of the piston 26 valve port 24 is open, so that there is free circulation through this valve of oil pumped by the pump 17. The governor 28 is so arranged that when the motor shaft rotation reaches a predetermined speed the governor will collapse due to centrifugal force, to draw piston 26 outwardly of valve 21 to close the valve port 24. In this event oil pumped by the pump 17 will be forced out of valve port 22 and will build up pressure in conduit 23 and in a communicating piston chamber 31 to actuate a piston 32 therein to set brake shoes 34 against a brake drum 33 fixed to a hub of universal joint 8 so as to restrain rotation thereof and the part associated therewith, including the motor shaft 10, and thus prevent the speed of rotation of these parts from increasing further.

The brake includes two segments 34 pivoted on a pin 35 and positioned within the drum 33. Each segment 34 is provided with suitable brake lining material 36. Under normal conditions the segments are held by spring 41 so as not to exert braking effect. The brake shoes 34 are adapted to be expanded against the drum 33 by means of a cam 37 which is rotatably disposed between the ends of the shoes 34 and is actuated by a lever 38 which is pivotally connected with the piston rod 39 of piston 32. A spring 40 encircling rod 39 and engaged between piston 32 and one end of the piston cylinder normally maintains the piston in brake releasing position.

The operation of my improved means for automatically protecting the motor shaft and other rotating parts of the drive from damage from centrifugal forces attending excessive rotational speeds will be readily apparent. As before stated, under normal speeds of rotation the brake will remain released, since under these conditions oil circulated by pump 17 recirculates freely through open valve port 24. However, should the motor shaft 10 attain the speed to which the governor 28 is responsive to close the valve port 24, the brake is immediately set with increasing pressure due to the closing of port 24 and the continued action of pump 17 which now forces oil into conduit 23 and brake operating cylinder 31, until the speed of rotation of the motor shaft 10 is reduced sufficiently to allow valve piston 26 to open port 24. Thereupon pressure is released from the brake and it automatically assumes released condition. It will be noted that the device has considerable flexibility of operation and, therefore, there are no shocks established during the operation of the motor braking means which might damage or injure the parts. The positiveness of operation is also insured. In the operation of the device the speed of the vehicle is reduced whenever the speed of motor shaft 10 is reduced, but this reduction in vehicle speed is merely incidental to the protection rendered to the electric motor from the possibility of damage due to excessive motor speed. Lack of such protection to the motor has been a material handicap and a constant menace in connection with gas-electric drive developments for highway vehicles. With my improved arrangement and construction the increased capacity and other advantages of the gas-electric drive for automotive vehicles becomes available by reason of the protection my invention provides to the motor.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

The combination, in a vehicle, of an electric motor having an armature-shaft, a transmission assembly including a universal joint, hydraulic braking means acting on the hub of the universal joint and including a conduit for the circulation of the braking fluid, a piston-valve in said conduit, and means including a centrifugal governor connected with the piston of said valve and secured to the armature-shaft of said motor for rotation therewith, said governor being adapted to close said valve when the revolution of said armature-shaft exceeds a certain speed of rotation to thereupon cause the braking system to exert braking action on the transmission system and to retard the rotation of said universal joint and the parts associated therewith.

This specification signed this 10th day of November, 1925.

THOMAS S. KEMBLE.